(12) United States Patent
Hyun et al.

(10) Patent No.: US 12,525,275 B2
(45) Date of Patent: Jan. 13, 2026

(54) SEMICONDUCTOR DEVICE FOR BOOSTING POWER PROVIDED TO CORE CIRCUIT

(71) Applicants: SK hynix Inc., Icheon-si (KR); IUCF-HYU (Industry-University Cooperation Foundation Hanyang University), Seoul (KR)

(72) Inventors: Jin Hoon Hyun, Icheon-si (KR); Jaemyung Lim, Seoul (KR)

(73) Assignees: SK hynix Inc., Icheon-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 122 days.

(21) Appl. No.: 18/584,918

(22) Filed: Feb. 22, 2024

(65) Prior Publication Data

US 2025/0140302 A1    May 1, 2025

(30) Foreign Application Priority Data

Oct. 31, 2023   (KR) .......................... 10-2023-0147895

(51) Int. Cl.
*G11C 5/14*      (2006.01)
*G11C 11/4074*   (2006.01)
*G11C 11/4091*   (2006.01)

(52) U.S. Cl.
CPC ...... *G11C 11/4074* (2013.01); *G11C 11/4091* (2013.01)

(58) Field of Classification Search
CPC ................. G11C 11/4047; G11C 11/4091
See application file for complete search history.

(56) References Cited

U.S. PATENT DOCUMENTS

| | | | |
|---|---|---|---|
| 6,137,343 A * | 10/2000 | Matano | G11C 5/145 327/535 |
| 11,581,043 B2 | 2/2023 | Yamada | |
| 2007/0285990 A1 | 12/2007 | Lee | |
| 2010/0074032 A1* | 3/2010 | Childs | G11C 29/12 365/189.11 |
| 2011/0102089 A1* | 5/2011 | Nakaoka | G11C 11/4074 330/297 |

* cited by examiner

*Primary Examiner* — Min Huang

(57) ABSTRACT

A semiconductor device includes a driving circuit configured to generate a core voltage using a power supply voltage; a core circuit configured to perform a first operation and a second operation following the first operation, using the core voltage; and a boosting circuit configured to supply a boosting power to the core circuit, wherein the boosting circuit detects a voltage drop in the core voltage for a predetermined duration during the first operation, and supplies the boosting power, corresponding to the voltage drop, to the core circuit during the second operation.

9 Claims, 5 Drawing Sheets

SEMICONDUCTOR DEVICE FOR BOOSTING POWER PROVIDED TO CORE CIRCUIT

CROSS-REFERENCE TO RELATED APPLICATION

The present application claims priority under 35 U.S.C. § 119(a) to Korean Patent Application No. 10-2023-0147895, filed on Oct. 31, 2023, which is incorporated herein by reference in its entirety.

BACKGROUND

1. Technical Field

Various embodiments generally relate to a semiconductor device that boosts power provided to a core circuit by detecting a decrease in a transient voltage caused by power consumption of the core circuit.

2. Related Art

FIG. 1 is a block diagram of a conventional semiconductor device 1.

The conventional semiconductor device 1 includes a master driving circuit 10 and a plurality of slave driving circuits 20.

The master driving circuit 10 generates an internal power supply voltage VDD using an external power source and provides it to the plurality of slave driving circuits 20 through a power distribution network (PDN) 30.

The slave driving circuit 20 generates a core voltage VCORE using the internal power supply voltage VDD provided through the PDN 30 and provides the core voltage VCORE to a core circuit 40.

A sense amplifier included in a dynamic random access memory (DRAM) is an example of the core circuit 40 included in the semiconductor device 1.

The sense amplifier 40 performs a mismatch compensation operation and a sensing operation using the core voltage VCORE. At this time, the mismatch compensation operation is an operation to compensate for the offset present in the sense amplifier 40.

As the mismatch compensation operation is performed, the AC level of the core voltage VCORE supplied to the sense amplifier 40 may be instantaneously decreased. When the sensing operation is performed continuously, this can lead to a further decline in the AC level of the core voltage VCORE, potentially resulting in issues such as the degradation of the sensing margin of the sense amplifier 40.

Consequently, in the conventional semiconductor device 1, the instability of the core voltage VCORE supplied to the core circuit 40 can result in malfunctions within the core circuit 40 and the semiconductor device 1 as a whole.

SUMMARY

In accordance with an embodiment of the present disclosure, a semiconductor device may include a driving circuit configured to generate a core voltage using a power supply voltage; a core circuit configured to perform a first operation and a second operation following the first operation, using the core voltage; and a boosting circuit configured to supply a boosting power to the core circuit, wherein the boosting circuit detects a voltage drop in the core voltage for a predetermined duration during the first operation, and supplies the boosting power, corresponding to the voltage drop, to the core circuit during the second operation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
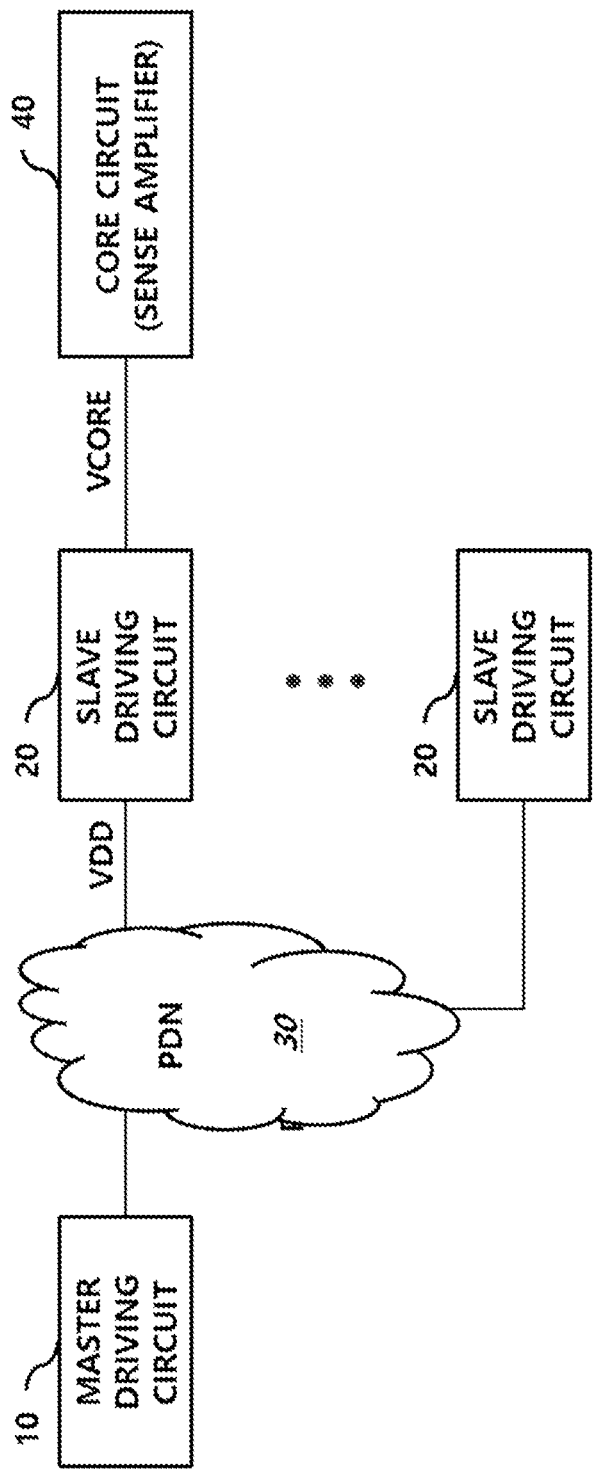
FIG. 1 illustrates a conventional semiconductor device.
Figure 2:
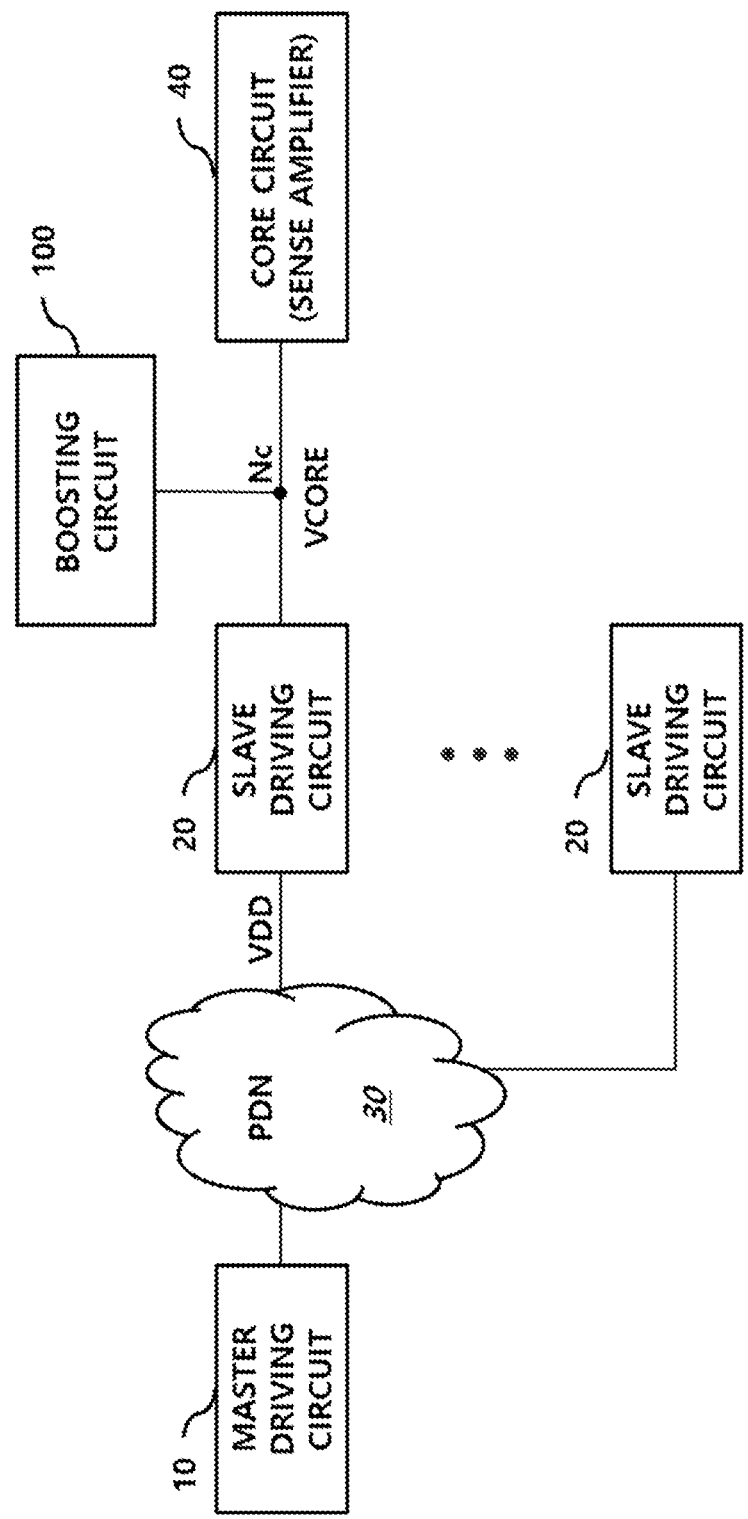
FIG. 2 illustrates a semiconductor device according to an embodiment of the present disclosure.

FIG. 2 is a block diagram showing a semiconductor device 1000 according to an embodiment of the present disclosure.

In this embodiment, the semiconductor device 1000 includes a master driving circuit 10 and a plurality of slave driving circuits 20.

The master driving circuit 10 generates a power supply voltage VDD using an external power source and provides the power supply voltage VDD to the plurality of slave driving circuits 20 through a power distribution network (PDN) 30.

The slave driving circuit 20 generates a core voltage VCORE using the power supply voltage VDD provided through the PDN (30) and provides the core voltage VCORE to a core circuit 40 through a core node Nc.

In this embodiment, the semiconductor device 1000 is a dynamic random access memory (DRAM), and the core circuit 40 is a sense amplifier included in the DRAM 1000. However, embodiments are not limited thereto.

In this embodiment, the semiconductor device 1000 includes a boosting circuit 100, which monitors the core voltage VCORE and reflects the monitoring result to supply a boosting current to the core circuit 40 through the core node Nc.

The core circuit 40 may sequentially perform a first operation and a second operation.

For example, the sense amplifier 40 may perform a mismatch compensation operation and subsequently perform a sensing operation. Here, the mismatch compensation operation corresponds to the first operation, and the sensing operation corresponds to the second operation.

The boosting circuit 100 detects a decrease in the core voltage VCORE caused by performing the first operation, and then reflects the detection result and supplies a boosting current to the core node Nc during the second operation.

Figure 3:
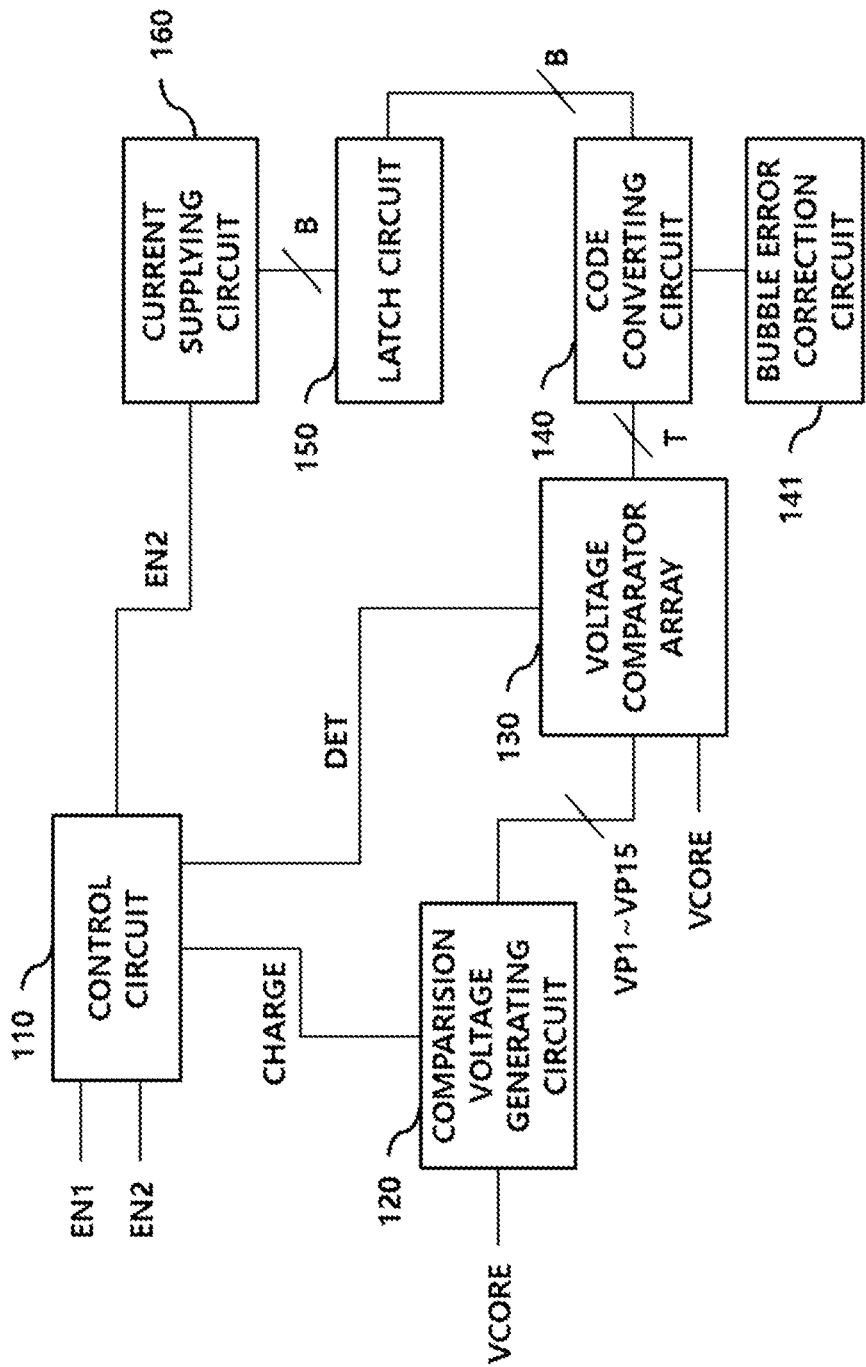
FIG. 3 illustrates a boosting circuit according to an embodiment of the present disclosure.

FIG. 3 is a block diagram showing the boosting circuit 100 of FIG. 2 according to an embodiment of the present disclosure.

The boosting circuit 100 includes a control circuit 110, a comparison voltage generating circuit 120, a voltage comparator array 130, a code converting circuit 140, a latch circuit 150, and a current supplying circuit 160.

The control circuit 110 generates a plurality of control signals that control the operation of the boosting circuit 100.

For example, the sense amplifier 40 performs the first operation, which is the mismatch compensation operation, during a first section where a first activation signal EN1 is enabled, for example, set to a high level. Following this, the sense amplifier 40 performs the second operation, which is the sensing operation, during a second section where the second activation signal EN2 is enabled, for example, set to the high level.

The first activation signal EN1 and the second activation signal EN2 may be derived from an activation signal EN.

For example, a first pulse of the activation signal EN may correspond to the first section in which the first activation signal EN1 is at the high level, and a second pulse of the activation signal EN may correspond to the second section in which the second activation signal EN2 is at the high level.

The control circuit 110 generates a detection signal DET in the form of a pulse, which remains at the high level for a predetermined duration after the first activation signal EN1 transitions to the high level.

At this time, the predetermined duration may vary depending on the operational characteristics of the core circuit 40. In an embodiment where the core circuit 40 is the sense amplifier, the predetermined duration may be a very short time of several nanoseconds or less.

The comparison voltage generating circuit 120 receives the core voltage VCORE and generates a plurality of comparison voltages VP1 to VP15 using the core voltage VCORE.

Figure 4:
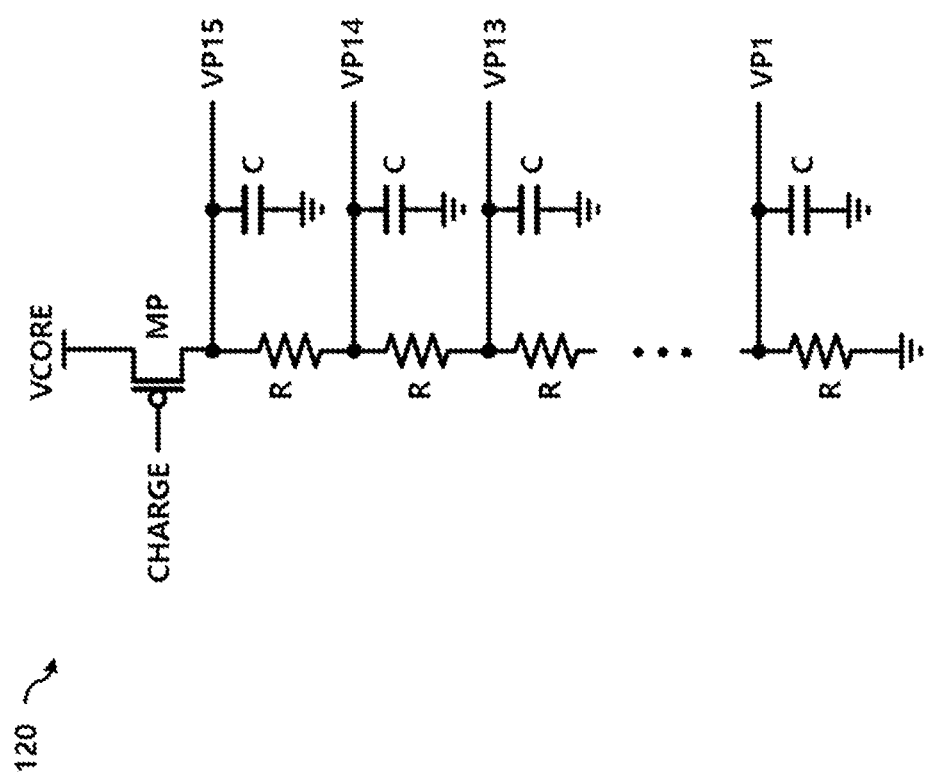
FIG. 4 illustrates a comparison voltage generating circuit according to an embodiment of the present disclosure.

FIG. 4 shows the comparison voltage generating circuit 120 of FIG. 3 according to an embodiment of the present disclosure.

The comparison voltage generating circuit 120 generates the plurality of comparison voltages VP1 to VP15 by dividing the core voltage VCORE while the core circuit 40 is inactive. Simultaneously, the comparison voltage generating circuit 120 charges a plurality of capacitors C that correspond to the plurality of comparison voltages VP1 to VP15, respectively.

The comparison voltage generating circuit 120 includes a PMOS transistor MP, a plurality of resistors R connected in series between the PMOS transistor MP and a ground voltage terminal, and the plurality of capacitors C connected in parallel to the plurality of resistors R, respectively.

A charging signal CHARGE is applied to a gate of the PMOS transistor MP, the core voltage VCORE is applied to a source thereof, and the plurality of resistors R connected in series are connected to a drain thereof.

The plurality of resistors R connected in series generate the plurality of comparison voltages VP1 to VP15 by dividing the core voltage VCORE when the charging signal CHARGE is enabled, for example, set to a low level.

In this embodiment, the charging signal CHARGE has the high level when the core circuit 40 operates, whereas the charging signal CHARGE has the low level when the core circuit 40 is inactive.

Assuming that the core circuit 40 exclusively performs the first operation and second operation, the charging signal CHARGE can be expressed using the following logical equation.

$$\text{CHARGE} = EN = EN1 \text{ OR } EN2 \qquad \text{[Equation 1]}$$

In this embodiment, a total of 15 comparison voltages are generated, denoted as VP1 for the lowest comparison voltage and VP15 for the highest comparison voltage.

The plurality of capacitors C charge the plurality of comparison voltages VP1 to VP15, respectively.

Returning to FIG. 3, the voltage comparator array 130 generates a multi-bit comparison signal T by comparing the plurality of comparison voltages VP1 to VP15 with the core voltage VCORE.

The voltage comparator array 130 includes a plurality of voltage comparators, and each voltage comparator determines a corresponding bit of the comparison signal T by comparing a corresponding comparison voltage among the plurality of comparison voltages VP1 to VP15 with the core voltage VCORE.

The voltage comparator array 130 outputs, as the comparison signal T, a comparison result when the detection signal DET is activated.

In this embodiment, since it is necessary to determine the comparison signal T within a very short period of time corresponding to a specific duration, optimal performance is achieved by ensuring that each voltage comparator operates at an exceptionally high speed. To fulfill this requirement, utilizing a voltage comparator designed in the form of a sense amplifier is advantageous.

In this embodiment, it is assumed that a voltage comparator outputs a low level when the core voltage VCORE is greater than the corresponding comparison voltage.

For example, when the core voltage VCORE is decreased to a level between VP15 and VP14 for a predetermined period of time, the comparison signal T may be determined as "10000 00000 00000," where "0" represents the low level.

The code converting circuit 140 converts the comparison signal T, generated in the form of a thermometer code, into a boosting signal B represented in a binary code. In this embodiment, the comparison signal T is a 15-bit signal and the boosting signal B is a 4-bit signal.

For example, when the comparison signal T is "10000 00000 00000," the boosting signal B may be "0001."

The boosting circuit 100 may further include a bubble error correction circuit 141, configured to correct errors in the comparison signal T.

Since the technology itself for performing bubble error correction on a thermometer code signal is well known in the art, detailed description thereof is omitted.

The latch circuit 150 latches and stores the boosting signal B. The boosting signal B has a value corresponding to the fluctuation range of the core voltage VCORE over a certain period of time, starting from the activation of the first activation signal EN1 until the detection signal DET is activated.

The current supplying circuit 160 provides the boosting current to the core node Nc according to the boosting control signal B stored in the latch circuit 150 when the second operation starts.

Figure 5:
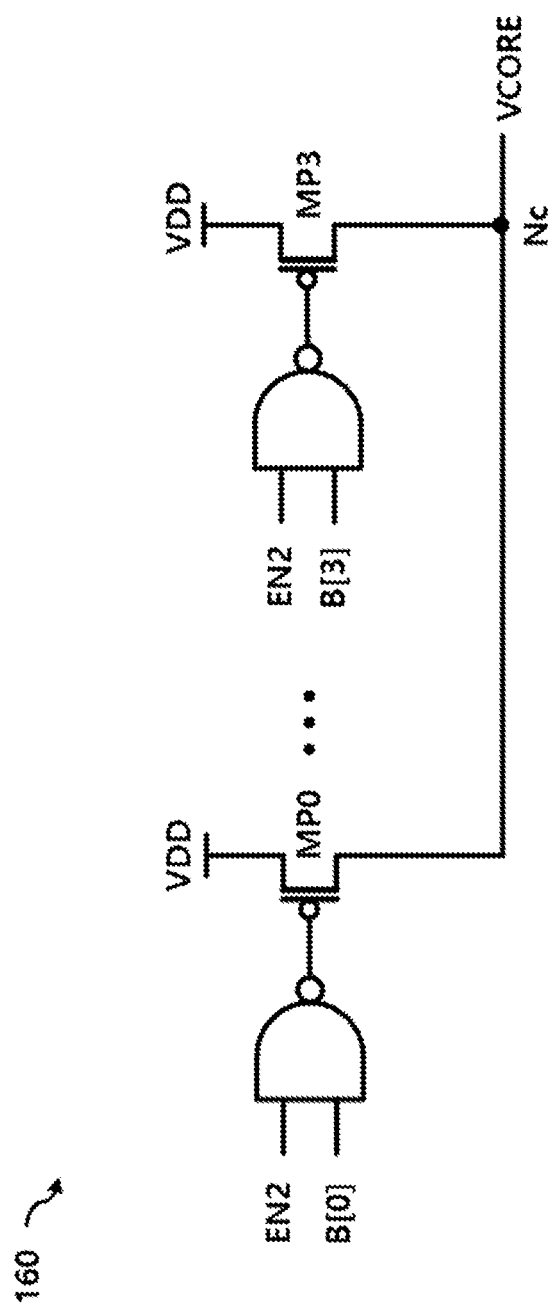
FIG. 5 illustrates a current providing circuit according to an embodiment of the present disclosure.

FIG. 5 is a circuit diagram showing the boosting circuit 160 of FIG. 3 according to an embodiment of the present disclosure.

The boosting circuit 160 includes a plurality of current supplying transistors, e.g., PMOS transistors MP0 to MP3, connected in parallel between the internal power supply source VDD and the core node Nc.

A gate of each of the plurality of PMOS transistors MP0 to MP3 is controlled according to a corresponding bit of the boosting signal B and the second activation signal EN2.

The plurality of PMOS transistors MP0 to MP3 have different current supplying capabilities according to corresponding bits of the boosting signal B.

For example, a gate of the PMOS transistor MP0 is controlled according to a result of a NAND operation of the second activation signal EN2 and the 0-th bit B[0] of the boosting signal B, and a gate of the PMOS transistor MP3 is controlled according to a result of a NAND operation of the second activation signal EN2 and the third bit B[3] of the boosting signal B.

In this embodiment, a size of a PMOS transistor associated with the higher bit of the boosting signal B is configured to be larger than a size of a PMOS transistor associated with the lower bit of the boosting signal B, thereby enabling a greater current flow to the core node Nc when the core voltage VCORE is decreasing to a lower level.

For example, the size and current supply capability of the PMOS transistor MP3 associated with the highest bit B[3] of the boosting signal B is 8 times those of the PMOS transistor MP0 associated with the lowest bit B[0] of the boosting signal B.

In the above example, when a voltage drop in the core voltage VCORE is not significant, such as when the core voltage VCORE decreases to a level between VP15 and VP14, the comparison signal T is determined as "10000 00000 00000," resulting in the boosting signal B being "0001." In this case, the lowest bit B[0] of the boosting signal B assumes a value of "1." As a result, the PMOS transistor MP0 is turned on, allowing the provision of boosting current, corresponding to the current supplying capability of the PMOS transistor MP0, to the core node Nc.

Although various embodiments have been illustrated and described, various changes and modifications may be made to the described embodiments without departing from the spirit and scope of the invention as defined by the following claims.

What is claimed is:

1. A semiconductor device comprising:
a driving circuit configured to generate a core voltage using a power supply voltage;
a core circuit configured to perform a first operation and a second operation following the first operation, using the core voltage; and
a boosting circuit configured to supply a boosting power to the core circuit,
wherein the boosting circuit detects a voltage drop in the core voltage for a predetermined duration during the first operation, and supplies the boosting power, corresponding to the voltage drop, to the core circuit during the second operation, and
wherein the boosting circuit includes:
a comparison voltage generating circuit configured to generate a plurality of comparison voltages using the core voltage;
a voltage comparator array configured to compare the plurality of comparison voltages with the core voltage; and
a current supplying circuit configured to provide, as the boosting power, a boosting current to the core circuit during the second operation, the boosting current corresponding to an output of the voltage comparator array.

2. The semiconductor device of claim 1, further comprising a master driving circuit configured to generate the power supply voltage using an external power supply, wherein the master driving circuit is connected to the driving circuit via a power distribution network.

3. The semiconductor device of claim 1, wherein the comparison voltage generating circuit includes a plurality of resistors configured to generate the plurality of comparison voltages by dividing the core voltage during periods when neither the first operation nor the second operation is in progress, and a plurality of capacitors configured to store charges associated with the plurality of comparison voltages.

4. The semiconductor device of claim 1, wherein the voltage comparator array outputs a comparison signal, presenting a comparison result, when the predetermined duration has elapsed since the beginning of the first operation.

5. The semiconductor device of claim 4, further comprising:
a code converting circuit configured to convert the comparison signal into a multi-bit binary signal; and
a latch circuit configured to latch the multi-bit binary signal as a boosting signal,
wherein the comparison signal is a multi-bit thermometer code signal, and
wherein the current supplying circuit supplies the boosting current, corresponding to the boosting signal, to the core circuit.

6. The semiconductor device of claim 5, wherein the current supplying circuit includes a plurality of current supplying transistors, and
wherein the plurality of current supplying transistors are controlled by the boosting signal during the second operation.

7. The semiconductor device of claim 6, wherein the plurality of current supplying transistors have different current supplying capabilities according to corresponding bits of the boosting signal, respectively.

8. The semiconductor device of claim 1, wherein the voltage comparator array includes a plurality of voltage comparators, each of which has a sense amplifier structure.

9. The semiconductor device of claim 1, wherein the current supplying circuit is configured to provide a higher boosting current in response to a greater magnitude of the voltage drop.

* * * * *